United States Patent
Nair et al.

(10) Patent No.: US 10,823,404 B1
(45) Date of Patent: Nov. 3, 2020

(54) MATERIALS HANDLING SYSTEM FOR FEED INJECTION TO THERMAL KILN RETORTS

(71) Applicant: Pyrodyne Thermal, LLC, Albuquerque, NM (US)

(72) Inventors: Keith Denton Nair, Bristol (GB); Daniel Christien Spokes, Newent (GB)

(73) Assignee: Pyrodyne Thermal, LLC, Albuquerque, NM (US)

( * ) Notice: Subject to any disclaimer, the term of this patent is extended or adjusted under 35 U.S.C. 154(b) by 659 days.

(21) Appl. No.: 15/457,807

(22) Filed: Mar. 13, 2017

Related U.S. Application Data

(60) Provisional application No. 62/307,187, filed on Mar. 11, 2016, provisional application No. 62/307,136, filed on Mar. 11, 2016, provisional application No. 62/307,216, filed on Mar. 11, 2016.

(51) Int. Cl.
  *F23G 5/027* (2006.01)
  *F23G 5/44* (2006.01)
  *F23G 5/50* (2006.01)

(52) U.S. Cl.
  CPC .......... *F23G 5/0276* (2013.01); *F23G 5/444* (2013.01); *F23G 5/50* (2013.01); *F23G 2205/10* (2013.01)

(58) Field of Classification Search
  CPC .......... F23G 5/0276; F23G 5/444; F23G 5/50
  See application file for complete search history.

(56) References Cited

U.S. PATENT DOCUMENTS 3,983,009 A * 9/1976 Neal ............... C10B 1/04
  202/93
4,445,910 A * 5/1984 Zimmerman ......... C10J 3/02
  202/117

(Continued)

FOREIGN PATENT DOCUMENTS

DE 4429390 A1 2/1996
EP 1865256 A1 12/2007

(Continued)

OTHER PUBLICATIONS

"Locating and Estimating Air Emissions from Sources of Mercury and Mercury Compounds", EPA-454/R-97-012, Dec. 1997.

(Continued)

*Primary Examiner* — Nathaniel Herzfeld
(74) *Attorney, Agent, or Firm* — Peacock Law P.C.; Justin R. Muehlmeyer

(57) ABSTRACT

Systems and methods for processing a waste stream for feeding into a thermal unit performing an airless or oxygen starved incineration process like pyrolysis. Embodiments comprise an inlet hopper for receiving a waste stream, an inlet hopper lid, a slide gate that when closed forms the base of the inlet hopper and when open allows the waste stream to pass into an intermediate hopper, a ram body that when closed forms the base of the intermediate hopper and when open allows the waste stream to pass into a ram cylinder, a crusher plate on the front face of the ram body, a ram for driving the ram body and its crusher plate forward into the waste within the cylinder, a compactor cone comprising teeth for splitting, and an outlet through which the crushed and split waste stream exits the system into a thermal unit.

12 Claims, 5 Drawing Sheets

(56) References Cited

U.S. PATENT DOCUMENTS

| | | | | |
|---|---|---|---|---|
| 4,528,917 | A | * | 7/1985 | Jacobs ............... F23B 1/16 110/101 CF |
| 5,009,171 | A | | 4/1991 | Martin et al. |
| 5,159,884 | A | | 11/1992 | Malick |
| 5,167,772 | A | * | 12/1992 | Parker, Sr. ............ C10B 7/00 100/232 |
| 5,265,545 | A | | 11/1993 | Milner |
| 5,664,491 | A | | 9/1997 | Maki et al. |
| 8,932,043 | B2 | * | 1/2015 | Wilhelm ........ B29B 17/0005 425/184 |
| 2009/0013985 | A1 | * | 1/2009 | Little ............... F24B 1/024 126/67 |
| 2009/0090282 | A1 | * | 4/2009 | Gold .................. F23G 5/006 110/229 |
| 2010/0206186 | A1 | | 8/2010 | Fraza |
| 2014/0007783 | A1 | | 1/2014 | Scheeres |
| 2014/0157660 | A1 | | 6/2014 | Carrera Varela et al. |
| 2014/0339346 | A1 | * | 11/2014 | Koenig ............... B02C 23/02 241/101.5 |

FOREIGN PATENT DOCUMENTS

| | | |
|---|---|---|
| JP | 01188310 A | 7/1989 |
| JP | 2008155582 A | 7/2008 |
| RU | 2382308 C1 | 2/2010 |
| WO | 0168152 A2 | 9/2001 |
| WO | 2013172590 A1 | 11/2013 |
| WO | 2014079135 A1 | 5/2014 |

OTHER PUBLICATIONS

"Waste Handling Systems—Matthews Cremation", http://www.matthewscremation.com/products/waste-incineration/waste-handling-systems.html, Apr. 13, 2014.

* cited by examiner

MATERIALS HANDLING SYSTEM FOR FEED INJECTION TO THERMAL KILN RETORTS

CROSS REFERENCE

This application claims priority to U.S. Provisional Patent Application Ser. No. 62/307,187, entitled "Materials Handling System for Feed Injection to Thermal Kiln Retorts", filed on Mar. 11, 2016, and U.S. Provisional Patent Application Ser. No. 62/307,216, entitled "Ash Handling System for Thermal Units" filed on Mar. 11, 2016, and U.S. Provisional Patent Application Ser. No. 62/307,136, entitled "Mechanical Rotary Hydraulically Cooled Seal, Roller Support and Drive for Thermal Kiln Retorts", filed on Mar. 11, 2016, and the specifications thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

NAMES AND PARTIES TO A JOINT RESEARCH AGREEMENT

Not Applicable.

SEQUENCE LISTING

Not Applicable.

STATEMENT REGARDING PRIOR DISCLOSURES

Not Applicable.

COPYRIGHTED MATERIAL

Not Applicable.

BACKGROUND OF THE INVENTION

Field of the Invention (Technical Field)

The present invention relates to methods and apparatuses for delivering fuel to a thermal kiln performing an airless or oxygen starved incineration process like pyrolysis.

DESCRIPTION OF RELATED ART

Systems that convert waste to energy through airless or oxygen starved thermal processes like pyrolysis require the waste to be processed before the waste can enter the thermal unit and undergo pyrolysis efficiently. The waste material fed into a thermal unit as its fuel must be processed to have the largest surface area available to the heat to start the pyrolysis process efficiently.

To reduce the particle size of the waste fuel material and increase its exposed surface area, shredding, splitting, or crushing can be employed. Shredding is a violent process that reduces the fuel to small particles by fast rotating motion of either knives or hammer shredders. It is preferable to process some waste streams such as hazardous medical waste and hazardous chemical waste by less violent procedures than shredding. Certain types of waste streams, for example medical waste and chemical waste, are particularly difficult and hazardous to process and feed into a thermal unit because of the general composition of the material in the waste. When a waste stream is difficult to handle or has a risk of dangerous emissions and/or potential mixing issues, it is preferable to split and crush the waste material inside a materials handling system immediately before the waste stream's entry into the thermal unit.

Furthermore, for thermal units performing an airless or oxygen starved process like pyrolysis, air must not be allowed to enter the thermal unit from the materials handling system and any gases from the pyrolysis process occurring in the thermal must not be allowed to escape back through the materials handling system. Any uncontrolled ingress of oxygen into the thermal unit performing such airless or oxygen starved process may transform the process into a different undesired process (for example, combustion), may cause the desired process to be inefficient, or may cause unsafe conditions.

What is needed is a system for efficiently and safely feeding difficult or hazardous waste streams into a thermal unit performing an airless or oxygen starved process like pyrolysis in such a way that does not interfere with the oxygen controlled processes within the thermal unit.

BRIEF SUMMARY OF THE INVENTION

The objects of the present invention are directed to systems and methods for feeding difficult or hazardous waste streams into a thermal unit performing an airless or oxygen starved process like pyrolysis in such a way that does not interfere with the oxygen controlled processes within the thermal unit.

One object of the present invention is to process hazardous waste streams like medical and chemical waste for feeding into a thermal unit. Embodiments of the present invention employ processing components to split and crush such waste streams prior to feeding the waste into the thermal unit. Embodiments of the present invention preferably comprise an inlet hopper for receiving a waste stream, an inlet hopper lid for sealing the waste stream within the inlet hopper, a slide gate that when closed seals and forms the base of the inlet hopper for supporting the waste stream within the inlet hopper and when open allows the waste stream to pass into an intermediate hopper, a ram feed body that when closed seals and forms the base of the intermediate hopper to support the waste stream within the intermediate hopper and when open allows the waste stream to pass into a ram cylinder, a crusher plate on the front face of the ram body, a ram for driving the ram body and its crusher front face forward into the waste stream within the cylinder, a compactor cone on the end of the cylinder opposite the crusher plate of the ram body comprising teeth for splitting, and an outlet through which the crushed and split waste stream exits the system into a thermal unit.

Another object of the present invention is to process the waste stream and feed it into a thermal unit performing an airless or oxygen starved incineration process while preventing the ingress of air into the thermal unit and preventing the egress of the environment within the thermal unit into the feed system. Embodiments of the present invention accomplish this by a series of mechanical airlocks formed by components of the feed system processing the waste material and/or by using the waste material itself. Embodiments of the present invention preferably comprise a control system and sensors that direct the processing components of the feed system to open and close at appropriate times to form the mechanical air locks that prevent the ingress of air into the thermal unit and the egress of air out of the thermal unit and through the feed system. Preferably, while the inlet hopper lid is open, the slide gate forming the base of the inlet hopper is closed to seal. Once a sensor senses a preset level of waste in the inlet hopper, the control system directs the ram body below the slide gate to move forward to a closed position to seal, the inlet hopper lid to close, and the slide gate to open to permit the waste to fall onto the top of the closed ram body. The control system then directs the slide gate to close to seal and direct the ram body to move backwards to an open position allowing the waste to fall into the ram cylinder. The waste is then crushed and split by the ram body as it moves forward to push the waste through the compactor cone and into the thermal unit, the ram body simultaneously sealing the intermediate hopper as it moves forward. In this way, the environment within the thermal unit is never directly exposed to an open air environment.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF EMBODIMENTS OF THE INVENTION

Figure 1:
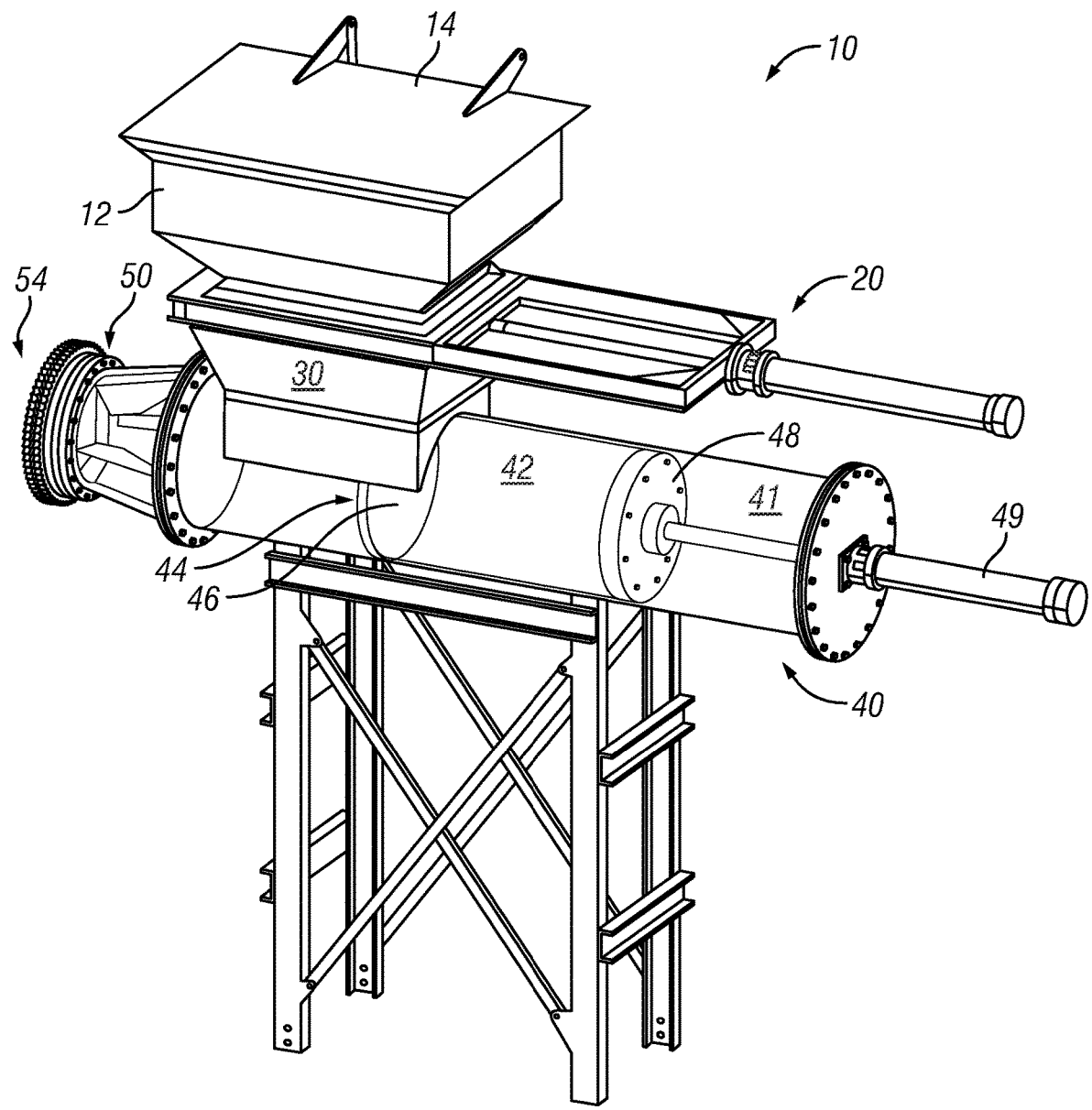
FIG. 1 is a schematic illustrating the general arrangement of an embodiment of the present invention from a perspective view.

Referring to the figures and particularly FIG. 1, embodiments of the present invention comprise methods and apparatuses for an air-tight waste material handling system 10 designed to process, by splitting and crushing, difficult waste streams such as hazardous medical and chemical waste for feeding into a thermal unit for pyrolysis. Preferably, material handling system 10 comprises an inlet hopper 12 and inlet hopper lid 14, a slide gate valve/guillotine 20, an intermediate hopper 30, a hydraulic ram feed 40, and a compactor cone 50 with splitting teeth 52. Preferably, a waste stream enters system 10 through the inlet hopper lid 14 and exits through the compactor cone outlet 54 for feeding into a thermal unit. Between entrance 10 and exit 54 are a series of mechanical air locks controlled by a control system that determines the positions of the internal components and waste based on a sequence of signals from sensors placed within material handling system 10 and thereby manages the air locks and processing.

Figure 2:
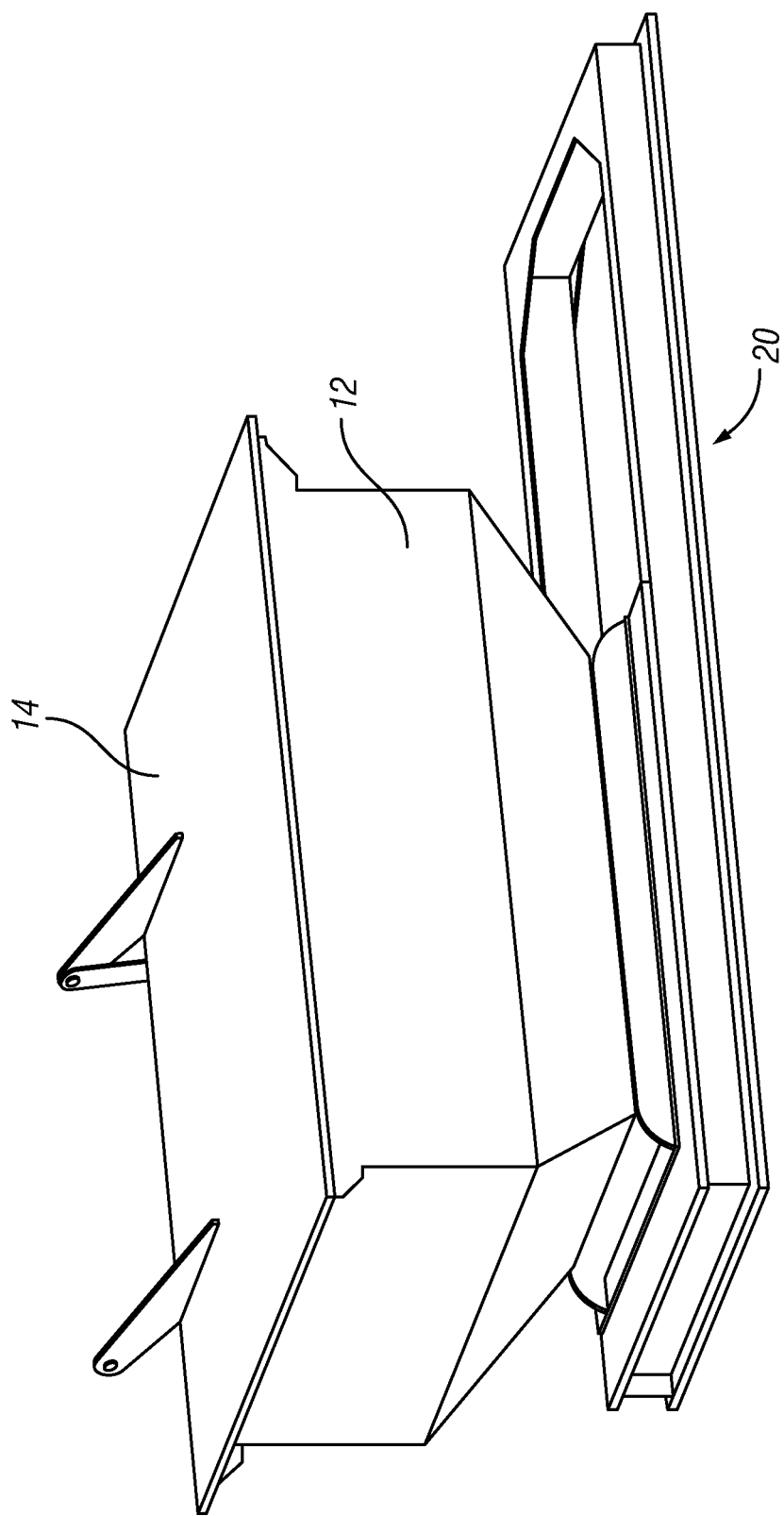
FIG. 2 is a schematic illustrating the inlet hopper and slide gate valve/guillotine of an embodiment of the present invention from a perspective view.

As best seen in FIGS. 1 and 2, embodiments of the present invention comprise inlet hopper 12 and inlet hopper lid 14. Raw waste is delivered to inlet hopper 12 by a method decided according to the project and site of installation of material handling system 10. Preferably, waste is delivered into inlet hopper 12 by a bin lift system that will operate under the control system to deliver bin loads of raw waste to inlet hopper 12. Preferably, inlet hopper 12 comprises sensors or limit switches that signal the control system of the need for more raw waste causing hopper lid 14 to open, the delivery bins empty the raw waste into the inlet hopper 12 through open lid 14, lid 14 closes to form a seal, and a switch signals the control system that lid 14 has closed. Embodiments of inlet hopper 12 need not comprise any sensors or switches, but may be controlled by other means including but not limited to manual control, and may comprise other sensors, including but not limited to sensors for indicating fire.

Preferably, inlet hopper 12 is shaped with straight sides near its top and convergent sides as you approach its bottom to allow the waste to fall under gravity, the bottom being formed by the slide gate valve/guillotine 20. Inlet hopper lid 14 is shaped to cover the top of inlet hopper 12 and form a substantially air tight seal. Inlet hopper 12 and inlet hopper lid 14 are formed of stainless steel, however, other embodiments may be formed of any material capable of supporting the waste stream and capable of withstanding the temperatures created by the kiln of the thermal unit. Embodiments of inlet hopper 12 and inlet hopper lid 14 may be containers shaped in other ways, including but not limited to shapes with no convergent sides and shapes with curved sides and edges. Inlet hopper lid 14 may open and close by use of hydraulic or motorized systems and need not open and close by hinges, but may open and close by for example sliding or shutter systems.

Figure 3:
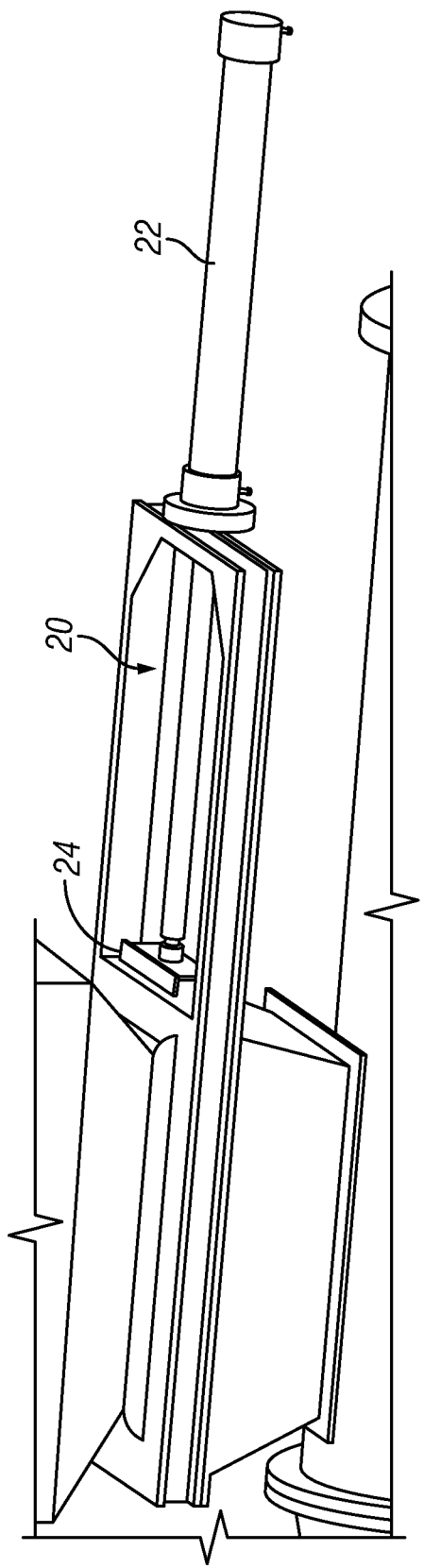
FIG. 3 is schematic illustrating the bottom of the inlet hopper, the slide gate valve/guillotine, and the intermediate hopper of an embodiment of the present invention from a perspective view.

Embodiments of the present invention comprise slide gate valve/guillotine 20 directly below inlet hopper 12. Referring to FIG. 3, in the preferred embodiment, slide gate valve 20 is of stainless steel and comprises a hydraulic powered ram 22 to drive a steel blade 24 capable of cutting through the waste stream to form an air-tight seal between inlet hopper 12 and intermediate hopper 30. Embodiments of slide gate valve 20 may comprise other methods of driving the blade and other materials, including but not limited to opening and closing a blade without a ram but with shutter mechanisms. Preferably, when the inlet hopper lid 14 is open and a waste stream is being delivered into inlet hopper 12, slide gate valve 20 is closed and forms the base of inlet hopper 12. Waste accumulates in inlet hopper 12 supported by slide gate valve 20. Once the inlet hopper lid 14 has closed and a seal formed, slide gate valve 20 will open allowing raw waste to fall into intermediate hopper 30. The base of the intermediate hopper 30 will be formed by the hydraulic feed ram body 42 being in its forward position. Waste will sit on top of feed ram body 42 until slide gate valve 20 above it has closed and a seal has been formed. Sensors or limit switches on slide valve 20 will signal to the control system that the seal has been formed.

Preferably, intermediate hopper 30 is of a stainless steel material and shaped with convergent sides as one approaches the bottom to allow the waste to fall under gravity, however, other embodiments may be formed of any material capable of supporting the waste stream and capable of withstanding the temperatures created by the thermal unit and may be shaped in other ways, including but not limited to shapes with no convergent sides and shapes with curved sides and edges. Preferably, the size of the inlet hopper 12 and intermediate hopper 30 are such that all contents of the delivery bin fit within inlet hopper 12 and intermediate hopper 30 to form an air-tight seal. However, other embodiments of inlet hopper 12 and intermediate hopper 30 need not be so sized and may depend on the nature of the project and waste stream.

Figure 4:
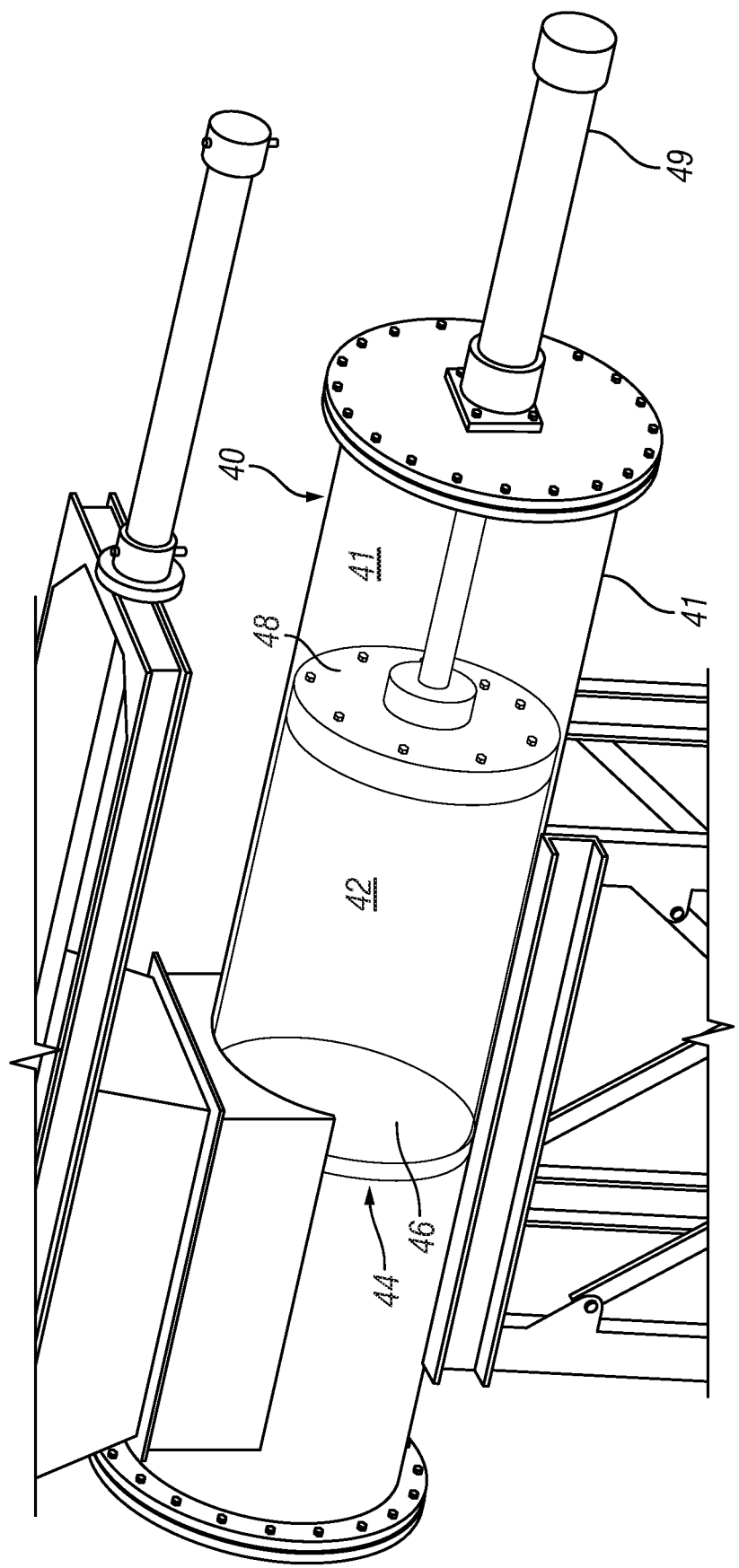
FIG. 4 is schematic illustrating the ram feed of an embodiment of the present invention from a perspective view.
Figure 5:
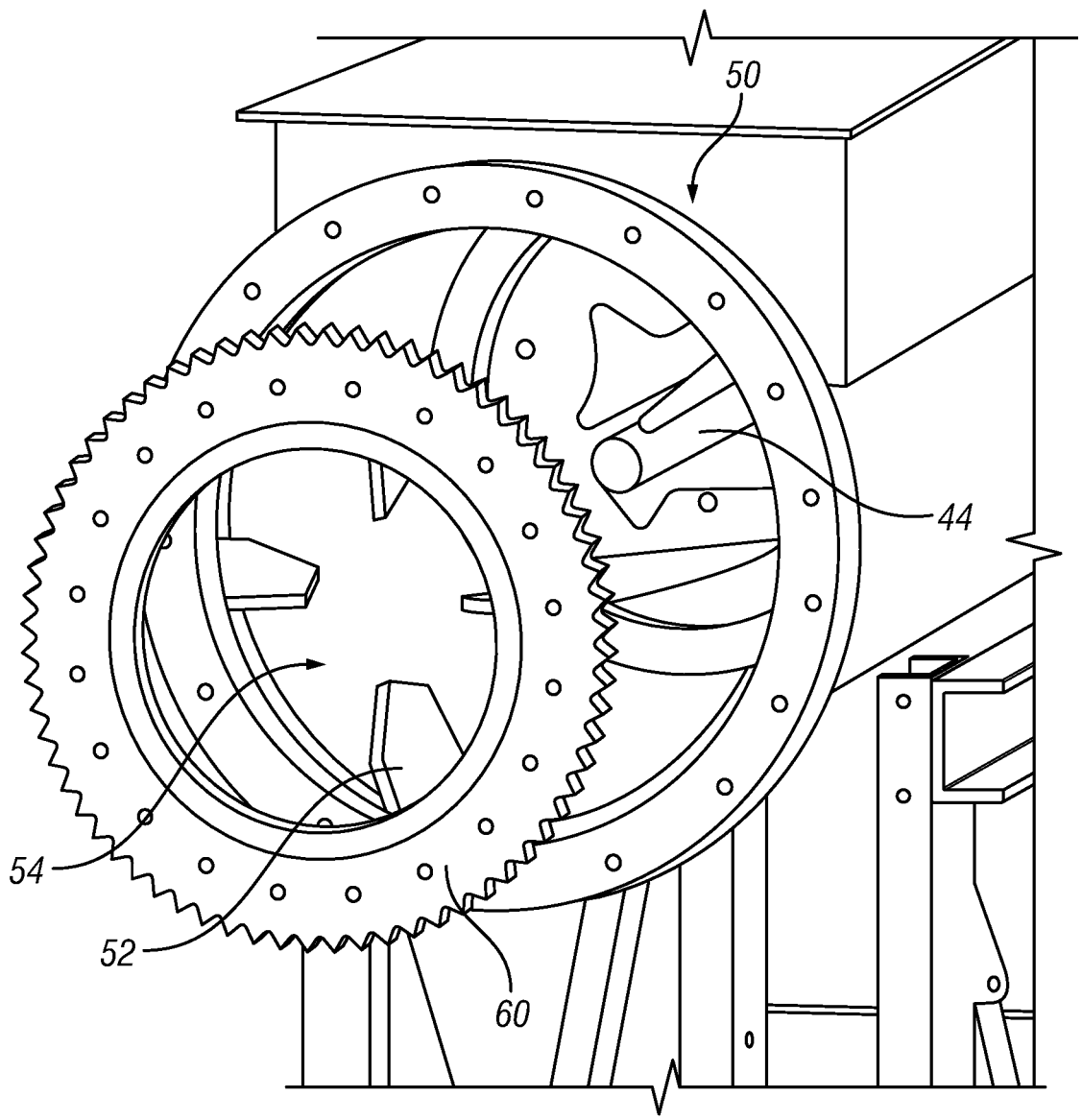
FIG. 5 is schematic illustrating the compactor cone of an embodiment of the present invention from a perspective view.

Embodiments of the present invention comprise a hydraulic ram feed unit 40. Referring to FIGS. 1 and 4, in the preferred embodiment, hydraulic ram feed unit 40 comprises a honed cylinder 41 in which ram feed body 42 is contained. Referring to FIG. 1, ram feed body 42 comprises a front pushing face with a spigot 44 hardened and/or shaped for pushing and crushing waste, a first radial mechanical seal 46 attached to and immediately behind front pushing face 44, a second radial mechanical seal 48 on the rear end of ram feed body 42 that prevents any waste exiting past the rear of the ram feed body 42, and a hydraulic ram 49 that drives ram body 42 forward and backward within cylinder 41. Once slide gate valve 20 has closed and a seal has been formed, feed ram body 42 will reverse and move back to allow the waste to fall into cylinder 41. Once the waste has fallen into cylinder 41, hydraulic ram 49 will drive ram body 42 forward to push the waste through compactor cone 50 and into a thermal unit.

Embodiments of the present invention comprise a compactor cone 50 between cylinder 41 and the inlet of a thermal unit. In the preferred embodiment, compactor cone 50 is a stainless steel cone bolted to cylinder 41 and reducing in size from the diameter of cylinder 41 to the diameter of the thermal unit inlet. The reducing cone shape creates a waste plug that will protect the crusher front plate 44 from the heat of the thermal unit. In some embodiments, the shape and size of compactor cone 50 may differ depending on the diameters of cylinder 41 and the inlet of the thermal unit. It may be attached to cylinder 41 by other means, including but not limited to welding or by virtue of being part of the same continuous material as cylinder 41. Preferably, compactor cone 50 comprises splitting teeth 52 formed as blades of stainless steel acting in conjunction with hydraulic ram crusher spigot 44 to crush and split the waste to expose more of its surface area. Splitting teeth 52 may be formed of other materials, of any size capable of fitting within compactor cone 50, of any number, and oriented at any angle.

Embodiments of the present invention comprise a rotary drive sprocket and bearing 60 between compactor cone 50 and the thermal unit inlet. Preferably, drive sprocket 60 is connected to the rotating tube section of the thermal unit with the bearing around the static outlet of compactor cone 50 and is driven by a chain attached to the drive motor. Embodiments of the present invention may employ other methods of driving the rotating tube section of the thermal unit and so may not require sprocket and bearing 60.

Embodiments of the present invention comprise sensors or switches placed within material handling system 10. Preferably, there are waste level sensors placed within inlet hopper 12 and on slide valve 20, however, sensors may be located at any place within or on material handling system 10 to detect or measure any variable, including but not limited to waste level, the presence of fire, temperature, etc. Preferably, a computer receives and interprets the signals from the sensors in order to manage the delivery of waste into material handling system 10. Based on information from the sensors, or manual control by users, the computer causes the opening and closing of inlet hopper lid 14, and directs the operation of blade drive 22 and ram 49. Embodiments of the computer may have different or additional functions.

Embodiments of the present invention are intended to coordinate the above described components and processes in an efficient way. For example, when ram body 42 is in a back position permitting the waste stream to pass from intermediate hopper 30 into ram cylinder 41, inlet hopper lid 14 is directed to open and slide gate 20 is directed to close in order to receive another waste stream into inlet hopper 12. In this way, one waste stream is received and sealed to prevent the ingress and egress of air while another waste stream is being crushed and split for feeding into the thermal unit.

One skilled in the art will realize that other embodiments of the present invention, not explicitly taught in the preceding embodiments, can likewise achieve the desired goal of the present invention. Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A system for feeding material into a thermal unit performing an airless or oxygen starved incineration process, comprising:

an inlet container for receiving the material;

an intermediate container;

a slide gate that when in a closed position forms the base of said inlet container for supporting the material within said inlet container and when in an open position permits the material to move from said inlet container into said intermediate container;

a ram container comprising a front and back end;

a ram body within said ram container that when in a forward position towards the front end of said ram container forms the base of said intermediate container for supporting the material within said intermediate container and when in a back position towards the back end of said ram container permits the material to move from said intermediate container into said ram container, wherein said ram body comprises a front face;

a ram attached to said ram body for driving said ram body within said ram container toward the front and back ends of said ram container;

a splitter within said ram container at or near said front end of said ram container for splitting the material;

an outlet at or near said front end of said ram container through which the material may pass to the thermal unit; and material-level sensors capable of sensing the level of the materials within the system and of sending signals to a control system, wherein said control system is capable of receiving signals from said material-level sensors and capable of coordinating the opening and closing of said slide gate and the positioning of said ram body in either said forward or back positions such that the material itself assists in preventing the ingress or egress of air into the system.

2. The system of claim 1 wherein said inlet container comprises a lid that when in a closed position substantially prevents the ingress and egress of air.

3. The system of claim 1 wherein said slide gate when in a closed position substantially prevents the ingress and egress of air.

4. The system of claim 1 wherein said ram body when in a forward position substantially prevents the ingress and egress of air.

5. The system of claim 1 further comprising at least one drive system for driving said slide gate and/or said ram.

6. The system of claim 1 wherein said material-level sensors are disposed in at least said inlet container and on or near said slide gate, and wherein said control system is configured to cause at least two configurations: (1) a first configuration in which said control system is configured to cause a first unit of the material to be received in said inlet container when said slide gate is closed and to cause said ram body to be driven between said back and forward positions to push a second unit of the material through said outlet; and (2) a second configuration in which said control system is configured to cause said slide gate to open and to cause said ram body to be in said back position, once said material-level sensor disposed on or near said slide guide signals said control system.

7. The system of claim 1 wherein said slide gate comprises a blade.

8. The system of claim 1 wherein said ram container is a cylinder.

9. The system of claim 1 wherein said ram body comprises at least one seal substantially preventing the passage of any of the material past said seal.

10. The system of claim 1 wherein said front face of said ram body comprises a hardened surface for pushing and crushing the material.

11. The system of claim 1 wherein said splitter is the shape of a cone for compacting the material.

12. The system of claim 1 wherein said splitter comprises bladed teeth for splitting the material.

* * * * *